US008098576B2

(12) United States Patent
Sun

(10) Patent No.: US 8,098,576 B2
(45) Date of Patent: Jan. 17, 2012

(54) METHOD AND APPARATUS FOR PROVIDING A MULTICAST SERVICE WITH MULTIPLE TYPES OF PROTECTION AND RECOVERY

(75) Inventor: Jun Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 270 days.

(21) Appl. No.: 12/391,537

(22) Filed: Feb. 24, 2009

(65) Prior Publication Data

US 2009/0154346 A1 Jun. 18, 2009

Related U.S. Application Data

(63) Continuation of application No. PCT/CN2007/070502, filed on Aug. 16, 2007.

(30) Foreign Application Priority Data

Aug. 31, 2006 (CN) .......................... 2006 1 0112345

(51) Int. Cl.
G01R 31/08 (2006.01)
(52) U.S. Cl. ....................................... 370/225; 370/238
(58) Field of Classification Search .................. 370/217, 370/221, 225, 270, 235, 238, 242, 245, 248, 370/312, 390, 412, 417, 432; 709/238
See application file for complete search history.

(56) References Cited

U.S. PATENT DOCUMENTS

| 6,515,966 B1 | 2/2003 | Bardalai et al. |
| 6,515,967 B1 | 2/2003 | Wei et al. |
| 6,584,071 B1 * | 6/2003 | Kodialam et al. ............. 370/238 |
| 2002/0001310 A1 * | 1/2002 | Mai et al. ...................... 370/390 |
| 2002/0024956 A1 * | 2/2002 | Keller-Tuberg .......... 370/395.52 |
| 2004/0114616 A1 * | 6/2004 | Wang ............................ 370/412 |

(Continued)

FOREIGN PATENT DOCUMENTS

CN 1701571 A 11/2005

(Continued)

OTHER PUBLICATIONS

Banihelhem et al: "A Tree Division Approach ot Support Local Failure Recovery for Multicating in MPLS Networks", IEEE Proceedings of the 2005 Systems Commuications (ICW'05), copyright 2005 IEEE. Six pages numbered in the Office action (original document does not have page numbers).*

(Continued)

*Primary Examiner* — Andrew Lai
(74) *Attorney, Agent, or Firm* — Leydig, Voit & Mayer, Ltd.

(57) ABSTRACT

A multicast service method and apparatus for providing multicast service with various types of protections and recoveries. The method includes splitting a multicast service into a plurality of unidirectional point-to-point services from a source node to each sink node, where a signaling message of each unidirectional point-to-point services is independent of one another; establishing, at the source node which publishes the multicast service, one or more label switch paths for each unidirectional point-to-point service with the signaling messages; and receiving a notification message when a failure occurs in the network, where the notification message carries ID(s) of one or more label switch paths that are affected by the failure; establishing, by the source node, a recovered label switch path or a new backup label switch path in response to the notification message.

16 Claims, 2 Drawing Sheets

U.S. PATENT DOCUMENTS

2006/0159009 A1   7/2006  Kim et al.
2007/0174483 A1*  7/2007  Raj et al. .................. 709/238

FOREIGN PATENT DOCUMENTS

| CN | 1716904    A | 1/2006 |
| CN | 1741489    A | 3/2006 |
| CN | 1805412    A | 7/2006 |
| CN | 100456700  C | 1/2009 |
| WO | 2006/075277 A1 | 7/2006 |

OTHER PUBLICATIONS

Banimelhem et al., "A tree division approach to support local failure recovery for multicasting in MPLS networks," *2005 Systems Communications (ICW'05)*, 249-254 (Aug. 11, 2005).

Chen, "The LSP protection/restoration mechanism in GMPLS," submitted in partial fulfillment of the requirements for Master of Computer Science, University of Ottawa (Oct. 1, 2002).

Jorge et al., "Survey of recovery schemes in MPLS networks," *Proceedings of the International Conference on Dependability of Computer Systems (DEPCOS-RELCOMEX'06)*, 110-118 (May 1, 2006).

Pan et al., "Fast reroute extensions to RSVP-TE for LSP tunnels," *IETF Standard RFC 4090*, 1-38 (May 1, 2005).

Yasukawa et al., "Extended RSVP-TE for point-to-multipoint LSP tunnels," *IETF Standard (working draft)*, 1-30 (Feb. 2004).

Written Opinion of the International Searching Authority in corresponding PCT Application No. PCT/CN2007/070502 (Nov. 22, 2007).

Awduche et al., "RFC 3209—RSVP-TE: Extensions to RSVP for LSP Tunnels," Network Working Group, Dec. 2001, Internet Society, Reston, Virginia.

* cited by examiner

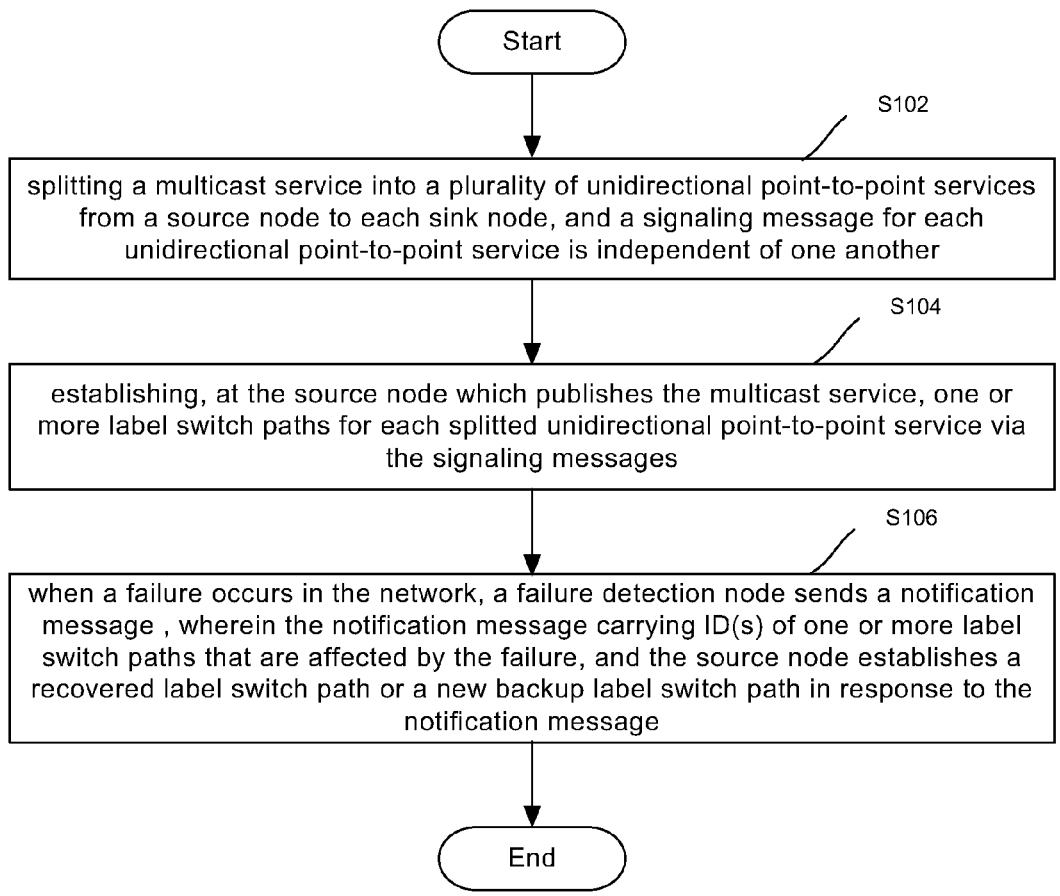
FIG.1
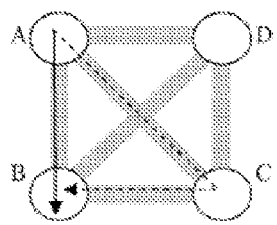    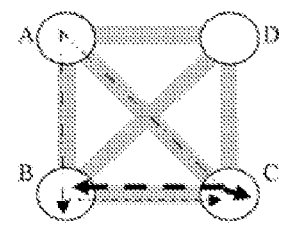    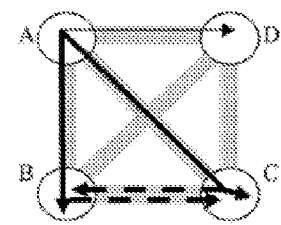
FIG.2    FIG.3    FIG.4

METHOD AND APPARATUS FOR PROVIDING A MULTICAST SERVICE WITH MULTIPLE TYPES OF PROTECTION AND RECOVERY

CROSS-REFERENCE TO RELATED APPLICATIONS

This application is a continuation of International Patent Application No. PCT/CN2007/070502, filed Aug. 16, 2007, which claims priority to Chinese Patent Application No. 200610112345.1, filed Aug. 31, 2006, both of which are hereby incorporated by reference in their entirety.

FIELD OF THE INVENTION

The present invention relates to communication field, and more particularly, to methods and apparatuses for providing multicast service with multiple types of protection and recovery in an Automatically Switched Optical Network (ASON).

BACKGROUND

In an operating network, multicast services can be carried on a multi-ring network constituted by traditional Synchronous Digital Hierarchy (SDH) Multiplex Section Protection (MSP) rings or Path Protection (PP) rings. If the rings in the ring network are relatively large, switching time of MSP may exceed 50 ms and up to 200 ms, or even more. The long switching time of MSP results in the black screen or mosaics on TV, and cannot satisfy the requirement that the recovery time of service protection should be less than 50 ms. Furthermore, a ring network cannot provide protection for a second fiber break failure. For a network that covers a broad area and has a high possibility of fiber break failures, it is desirable for the operator of the network to provide a service having a protection time less than 50 ms for both two fiber break failures. If the network has a low possibility of occurring failures and considering economic factors, a service that has a protection time less than 50 ms for the first failure and has a recovery time less than several hundreds milliseconds for the second failure is also desirable.

An ASON introduces a Control Plane (CP) between a Transport Plane (TP) and a Management Plane (MP), so that ASON has Automatic Neighbor Discovery Function, Automatic Link Discovery Function and Automatic Topology Discovery Function, and provides service with multiple types of protection and recovery such as Permanent 1+1 Protection, 1+1 Protection and Recovery, Dynamic Re-routing, and no protection. Presently, ASONs that provide connection services for various service levels of Point-to-Point service have come into commercial applications, but ASONs that support multicast service has not come into commercial applications. If a multicast service is split into a plurality of independent Point-to-Point services that cannot share the bandwidth, the bandwidth can be severely wasted although the requirement of various service levels is satisfied.

A solution is provided in the existing methods. According to the solution, multicast service is provided on a traditional SDH ring network, and routing and timeslots for the multicast service are configured by a network element cross-connect function or end to end connection management function in a network management system.

Such a solution cannot provide protection for a second fiber break failure, and the solution cannot provide protection of interconnection node failures in a single node interconnection ring either. For cross-ring service in a dual-node interconnection ring, though the solution can provide protection for a single node failure, service routing, service timeslot and service cross can only be configured manually. Both configuration and maintenance of the service are extremely complex. Furthermore, the ring network restricts the flexibility of network construction.

According to the existing methods, another solution is to provide a dynamic re-routing multicast service on ASON. However, dynamic re-routing services cannot satisfy the requirement that the recovery time of the first failure, even the second failure, shall be less than 50 ms.

Therefore, there is a need for a solution for providing multicast service with multiple types of protection and recovery, so as to address the above problems.

SUMMARY

Embodiments of the present invention are provided for addressing the problems that the multicast service provided in the current SDH ring network cannot provide protection for a second fiber break failure, and only dynamic re-routing multicast service can be provided in the current ASON, so that reliability requirements such as protection time for multicast service cannot be satisfied, and a multicast service with multiple types of protection and recovery cannot be accomplished as well.

According to one embodiment of the present invention, a method for protecting multicast service is provided. The method includes splitting a multicast service into a plurality of unidirectional point-to-point services from a source node to each sink node, where a signaling message of each unidirectional point-to-point service is independent of one another; establishing, at the source node which publishes the multicast service, one or more label switch paths for each unidirectional point-to-point service by the signaling messages; and receiving a notification message when a failure occurs in the network, where the notification message carries ID(s) of one or more label switch paths that are affected by the failure; establishing, by the source node, a recovered label switch path or a new backup label switch path in response to the notification message.

According to another embodiment of the present invention, an apparatus for protecting multicast service is provided. The apparatus includes a service splitting module, configured to split a multicast service into a plurality of unidirectional point-to-point services from a source node to each sink node, where signaling messages of the unidirectional point-to-point services are independent of one another; a label switch path building module, configured to establish, at the source node which publishes the multicast service, one or more label switch paths for each unidirectional point-to-point service via the signaling messages; and a failure processing module, configured to receive a notification message when a failure occurs in the network, and establish a recovered label switch path or a new backup label switch path in response to the notification message, where the notification message carries ID(s) of one or more label switched paths that are affected by the failure.

By using the above solutions, embodiments of the present invention allow the multicast service in the ASON to be able to support various types of protection and recovery meeting the reliability requirements on protection and recovery for multicast service such as Digital Television, IPTV. Embodiments of the present invention also realize bandwidth sharing and save bandwidth occupancy, and thus reduce cost of network investment, reduce complexity in development, reduce the cost and enhance the stability of the system.

BRIEF DESCRIPTION OF THE DRAWINGS

FIG. 1 illustrates a flowchart of a method for implementing protection of multicast service according to an embodiment of the present invention;

FIGS. 2-4 illustrate schematics of routing sharing and bandwidth sharing of label switch path (LSP) after branch services in the multicast service are established according to an embodiment of the present invention;

DETAILED DESCRIPTION

Figure 5:
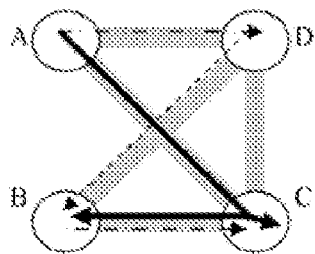
FIGS. 5-7 illustrate schematics of protection switching or recovery of service after a failure occurs in a link of the multicast service according to an embodiment of the present invention.

Embodiments of the present invention are described in detail in conjunction with the accompanying drawings.

Referring to FIG. 1, a flowchart of a method for implementing protection of multicast service is illustrated according to an embodiment of the present invention.

As shown in FIG. 1, a multicast service method includes the following steps. Step 102, a multicast service is split into a plurality of unidirectional point-to-point services from a source node to each sink node, and a signaling message of each unidirectional point-to-point service is independent of one another. Step 104, one or more label switch paths are established for each split unidirectional point-to-point service by the signaling messages at the source node which publishes the multicast service. Step 106, a failure detection node sends a notification message when a failure occurs in the network, where the notification message carries ID(s) of one or more label switch paths that are affected by the failure, and the source node establishes a recovered label switch path or a new backup label switch path in response to the notification message.

Optionally, all of the LSPs that belong to a same multicast service group have a globally unique multicast ID. The multicast ID is contained in a signaling message when the label switch path is being established. The multicast ID can be implemented in two ways. One is to define a new multicast ID object/sub-object in Resource Reservation Protocol (RSVP), and the other is to uniquely identify the multicast ID by using a combination of Tunnel ID and Extended Tunnel ID in a session objection, where the Extended Tunnel ID is the IPv4 or IPv6 address of the source node of the multicast. At the same source node, a plurality of LSPs that belong to a same multicast service group have the same Tunnel ID, LSPs belonging to different multicast service groups need to have different Tunnel IDs. Uniqueness of the Tunnel ID in a node and uniqueness of the Extended Tunnel ID in the whole network ensures uniqueness of the multicast ID after combination. The multicast ID is carried by a PATH message when LSP is being established.

Step 104 may include the following steps. Step 104-2, the source node searches for the established label switch paths that belong to a same multicast service group in a local database according to the multicast ID, unites links that the label switch paths pass through and obtains a link set. In a special case where it is a first time to establish the multicast service, the link set is null. Step 104-4, an explicit routing for primary label switch paths is computed by using the link set. Step 104-6, the signaling messages are sent in a per-hop manner according to the computed explicit routing. When assigning timeslot/label in the link that the explicit routing passes through at a node that the signaling message passes through, and if a timeslot/label has already been assigned for the same multicast ID in the link, the timeslot/label is reused.

Step 104-4 may further include the following steps. Step 104-4-2, weight values of the links contained in the link set are set to 0 or a minimal value, and then shortest path computation is performed in order to obtain the explicit routing. In a special case where the link set is null, the shortest path computation is performed directly.

With such a routing computing method, an LSP may share the bandwidth of other LSPs that belong to the same multicast service to the greatest extent and the total bandwidth occupied by the whole multicast service can be ensured at a minimum level. According to such routing strategy, the routing tree of the multicast service is no longer pure tree-structured, but a net-structured multicast tree with transverse connections existing between nodes in the tree. From a topology perspective, if one branch in the tree is broken, a net-structured tree will not be separated into two parts, as what a pure tree-structured tree will be. Thus, the net-structured tree has a relatively high self-cure ability.

When computing routing for establishing backup label switch paths, the shortest path may be computed after nodes, links, or Share Risk Link Groups (SRLGs) that the primary label switch paths pass through is labeled as being excluded.

Step 106 may include the following steps. Step 106-2, the source node searches for all the established label switch paths that belong to a same multicast service group in a local database according to the multicast ID, unites links that the label switch paths pass through and obtains a link set. Step 106-4, the link set is used to compute an explicit routing for the established recovered label switch path or new backup label switch path. Step 106-6, the signaling messages are sent in a per-hop manner according to the computed explicit routing. When assigning a timeslot/label in a link that the explicit routing passes through at the node that the signaling message passes through, and if a timeslot/label has been already assigned for the same multicast ID in the link, the timeslot/label is reused.

Step 106-4 may further include the following steps. Step 106-4-2, when establishing the recovered label switch path, after excluding the nodes or links that correspond to the IDs of the one or more affected label switch paths, weight values of the links contained in the link set are set to 0 or a minimal value, and the recovered label switch path routing is obtained by performing shortest path computation. Or, step 106-4-4, when computing routing for the established backup label switch paths, nodes, links, or SRLGs that the backup label switch paths pass through are labeled as being excluded, where the backup label switch paths are the paths relating to the nodes or links that correspond to the IDs of the one or more affected label switch paths. Then, weight values of the links contained in the link set are set to 0 or a minimal value. The new backup switch path routing is then obtained by performing shortest path computation.

Optionally, protection and recovered type for unidirectional point-to-point service may include at least one of the following: Permanent 1+1 Protection, 1+1 Protection and Recovery, Dynamic Recovery, and no protection.

Optionally, the label switch path may include at least one of the following: primary label switch path, backup label switch path, and recovered label switch path.

Optionally, except for the primary label switch path and the backup label switch path that belong to the same branch service do not share the routing and timeslot, all of the other label switch paths share the routing and timeslot.

Embodiments of the present invention are described below in conjunction with the accompanying drawings.

Firstly, referring to FIGS. 2-4, schematics of route sharing and bandwidth sharing of LSP after branch services in the multicast service are established are illustrated according to an embodiment of the present invention.

The network is an all-connected network including 4 nodes, namely A, B, C, and D, which are connected to each other. Source node of the multicast is node A, and sink nodes of the multicast are nodes B, C, D.

Here, protection and recovery type for each branch service are: Permanent 1+1 Protection, 1+1 Protection and Recovery, Dynamic Recovery.

Assume the bandwidth of the multicast source signal is 1, as shown in FIG. 2, when A→B is established, the total bandwidth is 3, as shown in FIG. 3, when A→C is established, the total bandwidth is 4, as shown in FIG. 4, when A→D is established, the total bandwidth is 5.

Optionally, thin solid lines in the figures denote new assigned bandwidth of primary LSP routings as a result of the new established branch services, thin dashed lines denote bandwidth of new established backup LSPs, double dotted and dashed lines denote LSP routings of new established branch services sharing the bandwidth of existing LSPs, and bold solid lines and bold dashed lines denote established LSPs.

As shown in FIG. 3, a link of a primary LSP routing of service A→C shares a link A-C of a backup LSP routing of service A→B; a link of a backup LSP routing of service A→C shares a link A-B of a primary LSP routing of service A→B. After service A→C is established, the total bandwidth is incremented by 1.

Figure 6:
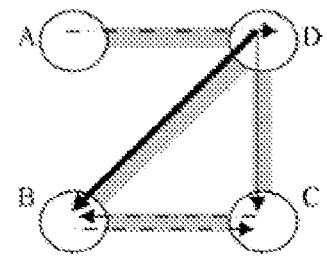
Figure 7:
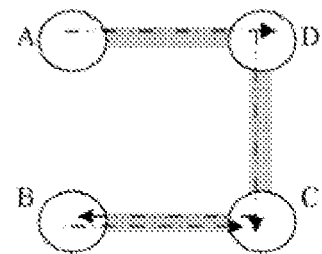

Referring to FIGS. 5-7, schematics of protection switching or recovery of service after failures occur in a link A-B, A-C, and D-B are illustrated. Thin solid lines in the figures denote new assigned bandwidth of primary LSP routings as a result of new established branch services, thin dashed lines denote bandwidth of new established backup LSPs, double dotted and dashed lines denote LSP routings of new established branch services sharing the bandwidth of existing LSPs, thick solid lines denote established LSPs, and single dotted and dashed lines denote bandwidth that carries no service signal.

Firstly, as shown in FIG. 5, a failure occurs in link A-B, then a backup LSP of service A→C (the routing is A-B-C) is affected. But, primary LSP of service A→C is not affected, service A→C operates in a normal state. Service A→D is also not affected.

At this time, a backup LSP of service A→B (the routing is A→C→B) becomes the primary LSP of service A→B, and a new backup LSP of service A→B is computed. Here, the new established backup LSP routing for service A→B is A-D-B, which shares the multicast bandwidth on link A-D, and newly uses the bandwidth on link B-D.

Secondly, as shown in FIG. 6, when a second link failure occurs, that is, link A-C is broken, service A→B triggers a primary-backup protection switching again. A Backup LSP of service A→B (the routing is A-D-B) becomes the primary LSP. Service A→B is not affected, but it is not able to further establish a new backup LSP for service A→B. The primary LSP of service A→C also fails, and dynamic re-routing is triggered. Here, the newly established recovered LSP for service A→C is A-D-C. This routing shares the multicast bandwidth on link A-D, and newly uses the bandwidth on link D-C.

As shown in FIG. 7, when a failure occurs on link D-B, a backup LSP of service A→C fails. But, the primary LSP of service A→C is not affected, service A→C operates in a normal state. Working LSP of service A→B (A-D-B) fails and re-routing is triggered, the process of re-routing is the same as the process of establishing recovered LSP as mentioned above, the difference is that the failed links or nodes shall be excluded when computing the routing.

It can be seen from FIGS. 5-7 that, in various failure circumstances, the multicast tree always tries to keep the best connection condition and sharing status, so that the protection and recovery ability of the multicast tree is improved.

Figure 8:
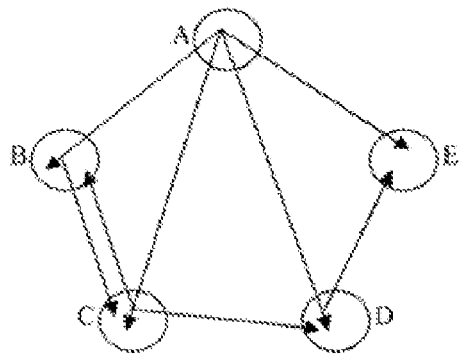
FIG. 8 illustrates a routing schematics in which a node in an all-connected network with 5 nodes multicasts to other 4 nodes according to an embodiment of the present invention.

FIG. 8 illustrates a routing schematic where a node in an all-connected network with 5 nodes multicasts to other 4 nodes. The protection type of all of the 4 branch services is 1+1 protection. From FIG. 8, it can be seen that the multicast tree is no longer pure tree-structured, but net-structured.

Based on the above description, methods for implementing protection of multicast service according to the embodiments of the present invention can support multicast service with various protection and recovery types, such as Permanent 1+1 Protection, 1+1 Protection and Recovery, Dynamic Recovery, and no protection, thus to meet the reliability requirements on protection and recovery for multicast service such as Digital Television, IPTV.

Figure 9:
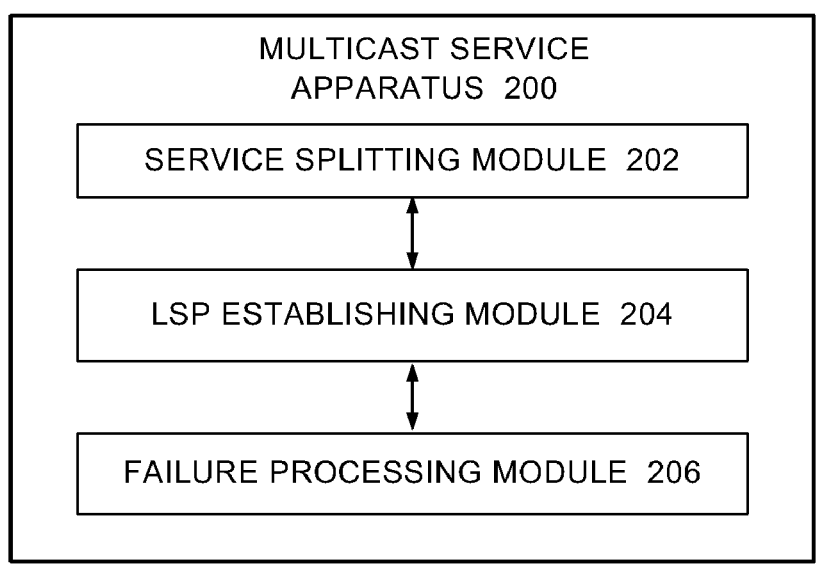
FIG. 9 illustrates a block diagram of an apparatus for implementing protection of multicast service according to an embodiment of the present invention.

Referring to FIG. 9, a block diagram of an apparatus for implementing protection of multicast service is illustrated according to an embodiment of the present invention.

As shown in FIG. 9, a multicast service apparatus 200 is configured to provide multicast service with various protection and recovery types. The apparatus 200 includes a service splitting module 202, configured to split a multicast service into a plurality of unidirectional point-to-point services from a source node to each sink node, where a signaling message of each unidirectional point-to-point service is independent of one another; a label switch path establishing module 204, configured to establish, at the source node which publishes the multicast service, one or more label switch paths for each unidirectional point-to-point service via the signaling messages; and a failure processing module 206, configured to receive a notification message sent by a failure detection node when a failure occurs in the network, where the notification message carries IDs of one or more label switched paths that are affected by the failure. The source node establishes a recovered label switch path or a new backup label switch path in response to the notification message.

Optionally, all of the LSPs that belong to a same multicast service group have a globally unique multicast ID, where the multicast ID is contained in a signaling message when the label switch path is being established.

Optionally, the network may be an Automatically Switched Optical Network (ASON).

Optionally, the label switch path establishing module 204 includes a link set building module (not shown), configured to enable the source node to search for the established label switch paths that belong to a same multicast service group in a local database according to the multicast ID, and configured to unite the links that the label switch paths pass through and obtain a link set; an explicit routing computing module (not shown), configured to compute an explicit routing for primary label switch paths by using the link set; and a signaling message sending module (not shown), configured to send the signaling messages in a per-hop manner according to the computed explicit routing, where when assigning timeslots/ labels in a link that the explicit routing passes through at the node that the signaling message passes through, and if a timeslot/label has already been assigned for the same multicast ID in the link, the timeslot/label is reused.

Optionally, when the explicit routing computing module is computing the routing, weight values of the links contained in the link set are set to 0 or a minimal value, then shortest path is computed to obtain the explicit routing.

Optionally, when computing routing for establishing backup label switch paths, the shortest path may be computed after nodes, links, or SRLGs that the primary label switch paths pass through are labeled as being excluded.

The failure processing module 206 includes a link set establishing module (not shown), configured to enable the source node to search for the established label switch paths that belong to a same multicast service group in a local database according to the multicast ID, and configured to unite links that the label switch paths pass through and obtain a link set; an explicit routing computing module (not shown), configured to compute an explicit routing for the primary label switch path by using the link set; and a signaling message sending module (not shown), configured to send the signaling messages in a per-hop manner according to the computed explicit routing, where when assigning a timeslot/label in a link that the explicit routing passes through at the node that the signaling message passes through, if a timeslot/label has already been assigned for the same multicast ID in the link, the timeslot/label is reused.

Optionally, when the explicit routing computing module is establishing the recovered label switch path, after the nodes or links that correspond to the IDs of the one or more affected label switch paths are excluded, weight values of the links contained in the link set are set to 0 or a minimal value, and the recovered label switch path routing is obtained by performing a shortest path computation. Or, when the explicit routing computing module explicit routing computing module is establishing a backup label switch path, after nodes, links, or SRLGs that the backup label switch path passes through are labeled as being excluded, where the backup label switch paths are the paths relating the nodes or links that correspond to the labels of the one or more affected label switch paths; and weight values of the links contained in the link set are set to 0 or a minimal value, the new backup switch path routing is obtained by performing a shortest path computation.

Optionally, protection and recovery type for unidirectional point-to-point service may include at least one of the following: Permanent 1+1 Protection, 1+1 Protection and Recovery, Dynamic Recovery, and no protection.

Optionally, the label switch path may include at least one of the following: primary label switch path, backup label switch path, and recovered label switch path.

Optionally, except for the primary label switch path and the backup label switch path that belong to the same branch service do not share the routing and timeslot, all of the other label switch paths share the routing and timeslot.

The method and apparatus for multicast service according to embodiments of the present invention is described above in detail, the method and apparatus can support various protection and recovered types, thus to meet the reliability requirements on protection and recovery for multicast service such as Digital Television, IPTV.

Additionally, embodiments of the present invention realizes bandwidth sharing and saves bandwidth occupancy by using routing sharing, improves the economical efficiency of multicast service while providing all of the functions of multicast service and satisfying the performance requirements. As such, the network investment cost can be reduced.

Furthermore, by using signaling splitting approach and routing sharing approach, it is not necessary to modify the existing signaling procedures. Only a little improvement is needed for routing computing and label assignment, thus complexity in development is considerably reduced, cost of product is decreased and stability of system is improved.

The above embodiments are merely used to illustrate the present invention but not to limit the present invention. Any modification, equivalent substitution, or improvement within the principal and spirit of the present invention shall be regarded as within the scope of the present invention.

What is claimed is:

1. A method for protecting multicast service comprising:
    splitting a multicast service into a plurality of unidirectional point-to-point services from a source node to a sink node, wherein a signaling message of each unidirectional point-to-point service is independent of one another;
    establishing, at the source node, which publishes the multicast service, one or more label switch paths for each of the plurality of unidirectional point-to-point services via each of the signaling messages, wherein each unidirectional point-to-point service corresponds to a primary label switch path and a backup label switch path,
        wherein the backup label switch path of a first unidirectional point-to-point service shares a same first link with the primary label switch path of a second unidirectional point-to-point service, and the primary label switch path of the first unidirectional point-to-point service shares a same second link with the backup label switch path of the second unidirectional point-to-point service;
    sending, by a failure detection node, a notification message when a failure occurs on the primary label switch path or on the backup label switch path, the notification message carrying at least one ID of one or more label switch paths that are affected by the failure; and
    establishing, by the source node, one of a recovered label switch path and a new backup label switch path in response to the notification message.

2. The method of claim 1, wherein all of label switch paths (LSPs) that belong to a same multicast service group have a globally unique multicast ID, and the multicast ID is contained in the signaling message when the one or more label switch paths are being established.

3. The method of claim 2, wherein establishing the one or more label switch paths comprises:
    searching for, by the source node, the established one or more label switch paths that belong to the same multicast service group according to the globally unique multicast ID, and uniting links that the found label switch paths pass through and obtaining a link set;
    computing an explicit routing by using the link set, wherein the explicit routing is one of the primary label switch path, the backup label switch path, the recovered label switch path, and the new backup switch label path; and
    sending the signaling message in a per-hop manner according to the computed explicit routing, wherein when assigning one of a time slot and a label in a link that the explicit routing passes through at a node that the signaling message passes through, and if the one of the time slot and the label has already been assigned to the same multicast ID in the link, the one of the time slot and the label assigned to the same multicast ID is reused.

4. The method of claim 3, wherein computing the explicit routing for the primary label switch path comprises:
    setting weight values of the links contained in the link set to one of a zero and a minimal value; and
    performing a shortest path computation and obtaining the explicit routing for the primary label switch path.

5. The method of claim 3, wherein computing the explicit routing for the backup label switch path comprises:

excluding one of a node, a link, and a Share Risk Link Group (SRLG) that the primary label switch path passes through;

setting weight values of the remaining links contained in the link set to one of a zero or a minimal value; and performing a shortest path computation and obtaining the explicit routing for the backup switch path.

6. The method of claim 3, wherein computing the explicit routing for the recovered label switch paths comprises:

excluding one of a failed node and a link that affects the one or more label switch paths whose ID(s) is carried in the notification message;

setting weight values of the remaining links contained in the link set to one of a zero and a minimal value; and performing a shortest path computation and obtaining the explicit routing for the recovered label switch path.

7. The method of claim 3, wherein computing the explicit routing for the new backup label switch paths comprises:

excluding one of a failed node and a link that affects the one or more label switch paths whose at least one ID is carried in the notification message;

excluding one of a node, a link, and a Share Risk Link Group (SRLG) that the primary label switch path passes through;

setting weight values of the remaining links contained in the link set to one of a zero and a minimal value; and performing a shortest path computation and obtaining the explicit routing for the new backup switch path.

8. The method of claim 3, wherein a protection and recovery type for each of the plurality of unidirectional point-to-point services comprises at least one of the following: Permanent 1+1 Protection, 1+1 Protection and Recovery, Dynamic Recovery, and no protection.

9. The method of claim 2, wherein a protection and recovery type for each of the plurality of unidirectional point-to-point services comprises at least one of the following: Permanent 1+1 Protection, 1+1 Protection and Recovery, Dynamic Recovery, and no protection.

10. The method of claim 1, wherein a protection and recovery type for each of the plurality of unidirectional point-to-point services comprises at least one of the following: Permanent 1+1 Protection, 1+1 Protection and Recovery, Dynamic Recovery, and no protection.

11. An apparatus for protecting multicast service comprising:

a service splitting module, configured to split a multicast service into a plurality of unidirectional point-to-point services from a source node to a sink node, wherein a signaling message of each of the plurality of unidirectional point-to-point services is independent of one another;

a label switch path establishing module, configured to establish, at the source node which publishes the multicast service, one or more label switch paths for each of the plurality of unidirectional point-to-point services by each of the signaling messages, wherein each unidirectional point-to-point service corresponds to a primary label switch path and a backup label switch path, wherein the backup label switch path of a first unidirectional point-to-point service shares a same first link with the primary label switch path of a second unidirectional point-to-point service, and the primary label switch path of the first unidirectional point-to-point service shares a same second link with the backup label switch path of the second unidirectional point-to-point service; and a failure processing module, configured to receive a notification message when a failure occurs on the primary label switch path or on the backup label switch path, and establish one of a recovered label switch path and a new backup label switch path in response to the notification message, the notification message carrying at least one ID of one or more label switch paths that are affected by the failure.

12. The apparatus of claim 11, wherein the label switch path establishing module comprises:

a link set building module, configured to enable the source node to search for the established label switch paths that belong to a same multicast service group according to a multicast ID, and configured to unite links that the found label switch paths pass through and obtain a link set;

an explicit routing computing module, configured to compute an explicit routing for a primary label switch path using the link set; and a signaling message sending module, configured to send the signaling message in a per-hop manner according to the computed explicit routing, wherein when assigning one of a time slot and a label in a link that the explicit routing passes through at a node that the signaling message passes through, and if the one of the time slot and the label has been assigned for a same multicast ID in the link, the one of the time slot and the label for the multicast ID is reused.

13. The apparatus of claim 12, wherein a protection and recovery type for each of the plurality of unidirectional point-to-point services comprises at least one of the following: Permanent 1+1 Protection, 1+1 Protection and Recovery, Dynamic Recovery, and no protection.

14. The apparatus of claim 11, wherein the failure processing module comprises:

a link set building module, configured to enable the source node to search for the established label switch paths that belong to a same multicast service group in a local database according to a multicast ID, and configured to unite links that the one or more label switch paths pass through and obtain a link set;

an explicit routing computing module, configured to compute an explicit routing for one of the established recovered label switch path and the new backup label switch path by using the link set; and a signaling message sending module, configured to send the signaling messages in a per-hop manner according to the computed explicit routing, wherein when assigning one of a time slot and a label in a link that the explicit routing passes through at a node that the signaling message passes through, and if the one of the time slot and the label has already been assigned for the multicast ID in the link, the one of the time slot and the label for the multicast ID is reused.

15. The apparatus of claim 14, wherein a protection and recovery type for each of the plurality of unidirectional point-to-point services comprises at least one of the following: Permanent 1+1 Protection, 1+1 Protection and Recovery, Dynamic Recovery, and no protection.

16. The apparatus of claim 11, wherein a protection and recovery type for each of the plurality of unidirectional point-to-point services comprises at least one of the following: Permanent 1+1 Protection, 1+1 Protection and Recovery, Dynamic Recovery, and no protection.

* * * * *